United States Patent [19]
Armstrong et al.

[11] Patent Number: 5,432,789
[45] Date of Patent: Jul. 11, 1995

[54] USE OF A SINGLE CENTRAL TRANSMIT AND RECEIVE MECHANISM FOR AUTOMATIC TOPOLOGY DETERMINATION OF MULTIPLE NETWORKS

[75] Inventors: Michael J. Armstrong; Paul Woodruff, both of Sunnyvale, Calif.

[73] Assignee: Synoptics Communications, Inc., Santa Clara, Calif.

[21] Appl. No.: 237,023

[22] Filed: May 3, 1994

[51] Int. Cl.⁶ .................................. H04J 3/24
[52] U.S. Cl. ............................. 370/92; 370/56
[58] Field of Search .............. 370/92, 56, 58.1, 85.13, 370/95.3, 100.1, 118, 85.3

[56] References Cited

U.S. PATENT DOCUMENTS

| | | | |
|---|---|---|---|
| 4,428,042 | 1/1984 | Niethhammer et al. | 370/92 |
| 4,608,684 | 8/1986 | Upp | 370/58.1 |
| 4,967,344 | 10/1990 | Scavezze et al. | 364/200 |
| 5,179,554 | 1/1993 | Lomicka et al. | 370/92 |
| 5,226,120 | 7/1993 | Brown et al. | 395/200 |
| 5,301,303 | 4/1994 | Abraham et al. | 370/85.13 |
| 5,319,644 | 6/1994 | Liang | 370/92 |

*Primary Examiner*—Douglas W. Olms
*Assistant Examiner*—Shick Hom
*Attorney, Agent, or Firm*—Blakely, Sokoloff, Taylor & Zafman

[57] ABSTRACT

A concentrator having a single medium access controller for monitoring a plurality of communication lines is provided. Each of the communication lines corresponds to a network and carries identification signals periodically transmitted by devices on the corresponding network. The medium access controller includes a transmit unit and a receive unit. The transmit unit sequentially broadcasts concentrator identification signals over each of the communication lines. The transmit unit sequences through the communication lines at a rate to insure that a concentrator identification signal is sent over each communication line during a predetermined transmit interval. The receive unit sequentially monitors the signals on each of the communication lines. The receive unit monitors the signals on any given communication line for a predetermined monitoring period before sequencing to the next communication line. The duration of the monitoring period for a given communication line is at least as long as the longest identification signal transmit interval for any device on the communication line. Consequently, the receive unit will detect an identification signal from all of the active devices on a given communication line during the monitoring period for the communication line. The receive unit stores an indication of the identification signals it detects and the ports on which they were detected. This stored information may be used by a network management station to generate a map showing how the concentrator is connected to other devices.

19 Claims, 3 Drawing Sheets

USE OF A SINGLE CENTRAL TRANSMIT AND RECEIVE MECHANISM FOR AUTOMATIC TOPOLOGY DETERMINATION OF MULTIPLE NETWORKS

BACKGROUND OF THE INVENTION

A computer network generally consists of a plurality of networked devices physically connected to each other through some communication medium, such as a copper or fiber optic cable. Networked devices typically include, for example, computer workstations, hubs or concentrators, and routers. As networks become increasingly complex, it becomes increasingly important to keep track of the various networked devices on a network, and how they are interconnected. Such interconnection information is referred to herein as the topology of the network.

In the past, a strategy has been developed for constructing the topology of a network based on databases maintained on each of the concentrators in the network. According to this strategy, certain devices ("ID-transmitting devices") such as concentrators, are configured to periodically generate identification signals. Each identification signal contains information identifying the D-transmitting device which originally generated the identification signal. When a concentrator receives an identification signal, a medium access controller ("MAC") in the concentrator stores data indicating (1) the D-transmitting device from which the identification signal originated, and (2) the specific slot and port on which the identification signal was received. The MAC stores this information in a database (a "ID/port database") on the concentrator.

The concentrator rebroadcasts the identification signals it receives, and its own identification signals, to all other concentrators on the network, which build their own ID/PORT databases. A network management station on the network periodically polls each concentrator to access the information contained in the various ID/PORT databases, and from this information constructs a database of the topology of the network. One example of this topology construction strategy is described in U.S. Pat. No. 5,226,120 issued to Brown et al. on Jul. 6, 1993.

The above-described strategy works well as long as each concentrator is able to monitor all of the identification signals it receives, and is able to send its own identification signals over all of the channels to which it is connected. A MAC can only monitor incoming identification signals on a single communication channel at a time. Therefore, as long as each concentrator contained only one communication channel, concentrators needed only one MAC to implement the above-described strategy.

However, concentrators have now been developed which support more than one communication channel. Such multiple-channel concentrators are superior to single channel models in that each communication channel may support an entirely separate network. While a MAC is monitoring and maintaining a database for the identification signals received over one communication channel in a given concentrator, identification signals received over all other communication channels in the given concentrator go unmonitored and unrecorded.

One way to guaranty that identification signals from all ID-transmitting devices connected to a multiple-channel concentrator are monitored and recorded, and to insure that a multiple-channel concentrator transmits its own identification signals over each channel to which it is connected, is to design the multiple-channel concentrator with one MAC per channel. Each channel would be monitored by its respective MAC, and each MAC would record the identification signals received over its respective channel in a central ID/PORT database. Each MAC would also transmit the concentrator's identification signals over its respective channel.

Unfortunately, the incorporation of multiple MACs into a single concentrator may significantly increase the price and complexity of the concentrator. Therefore, it is clearly desirable to provide a multiple-channel concentrator with a single MAC capable of accurately maintaining an ID/PORT database which reflects all of the ID-transmitting devices physically connected to a multiple-channel concentrator. In addition, it is desirable that the single MAC be capable of transmitting identification signals for the multiple-channel concentrator over all of the channels to which the concentrator is connected so that other concentrators may accurately maintain their own ID/PORT databases.

SUMMARY AND OBJECTS OF THE INVENTION

According to one embodiment of the present invention, a concentrator for use in a multiple-network system is provided. The multiple-network system contains a plurality of networks. Each network of the plurality of networks contains a plurality of network devices. Each ID-transmitting device of the plurality of network devices periodically broadcasts identification signals. The concentrator generally includes a plurality of channels and a medium access controller.

Each channel of the plurality of channels corresponds to a network of the plurality of networks. Each channel receives identification signals from all ID-transmitting devices on the corresponding network.

The medium access controller includes a transmit unit and a receive unit. The transmit unit is coupled to the plurality of channels. The transmit unit is configured to sequentially broadcast concentrator identification signals over each channel of the plurality of channels. The transmit unit broadcasts a concentrator identification signal over each channel of the plurality of channels at least once during a predetermined transmit interval.

The receive unit is also coupled to the plurality of channels. The receive unit sequentially monitors each channel of the plurality of channels for a predetermined monitoring period. The receive unit stores data indicative of the identification signals detected on each given channel of the plurality of channels during the monitoring period for the given channel.

According to one aspect of the invention, each ID-transmitting device of the plurality of network devices transmits an identification signal at a predetermined transmit interval. The predetermined monitoring period is equal to or greater than a longest predetermined transmit interval.

According to another aspect of the invention, a method for monitoring a plurality of identification signals received at a concentrator in a multiple-network system is provided. The concentrator has a plurality of channels. Each channel of the plurality of channels corresponds to a network. The method includes the step of sequentially broadcasting concentrator identification signals over each channel of the plurality of channels. The concentrator identification signals identify the concentrator. A concentrator identification signal is broadcast at least once over each channel during a predetermined transmit interval.

The method further includes the steps of sequentially monitoring each channel of the plurality of channels for a monitoring period and storing data indicative of the identification signals detected on each given channel of the plurality of channels during the monitoring period for the given channel.

According to another aspect of the invention, a concentrator for use in a multiple-network system is provided. The concentrator includes a plurality of channels, each of which corresponds to a network. The concentrator also includes a transmit unit, a receive unit, and a first and second plurality of lines.

Each line of the first plurality of lines connects the transmit unit to a corresponding channel of the plurality of channels through a corresponding switch. The first plurality of lines may be a subset of all the lines which connect the transmit unit to the plurality of channels. For example, the transmit unit may be connected to a given channel by more than one line. Preferably, only one of the lines connecting the transmit unit to any given channel is included in the first plurality of lines.

The transmit unit transmits a concentrator identification signal over a selected transmit line of the first plurality of lines. The transmit unit closes the corresponding switch of the selected transmit line prior to transmitting a concentrator identification signal over the selected transmit line and opens the corresponding switch after transmitting the concentrator identification signal over the selected transmit line. The transmit unit sequentially selects each line of the first plurality of lines as the selected transmit line.

Each line of the second plurality of lines connects the receive unit to a corresponding channel of the plurality of channels through a corresponding switch. The second plurality of lines may be a subset of all the lines which connect the receive unit to the plurality of channels. For example, the receive unit may be connected to a given channel by more than one line. Preferably, only one of the lines connecting the receive unit to any given channel is included in the second plurality of lines.

The receive unit monitors a selected monitored line of the second plurality of lines. The receive unit closes the corresponding switch of the selected monitored line prior to monitoring the selected monitored line and opens the corresponding switch after monitoring the selected monitored line. The receive unit sequentially selects each line of the second plurality of lines as the selected monitored line.

According to one aspect of the invention, the receive unit monitors the selected monitored line by detecting and storing data indicative of a plurality of identification signals received over the selected monitored line. The plurality of identification signals is generated by a plurality of monitored ID-transmitting devices connected to a monitored channel. The monitored channel is the channel corresponding to the selected monitored line.

According to another aspect of the invention, the receive unit monitors the selected monitored line for a predetermined monitoring period. Each monitored ID-transmitting device of the plurality of monitored ID-transmitting devices transmits an identification signal at least once during a predetermined transmit interval. The predetermined monitoring period is equal to or greater than predetermined transmit interval.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENT

Figure 1:
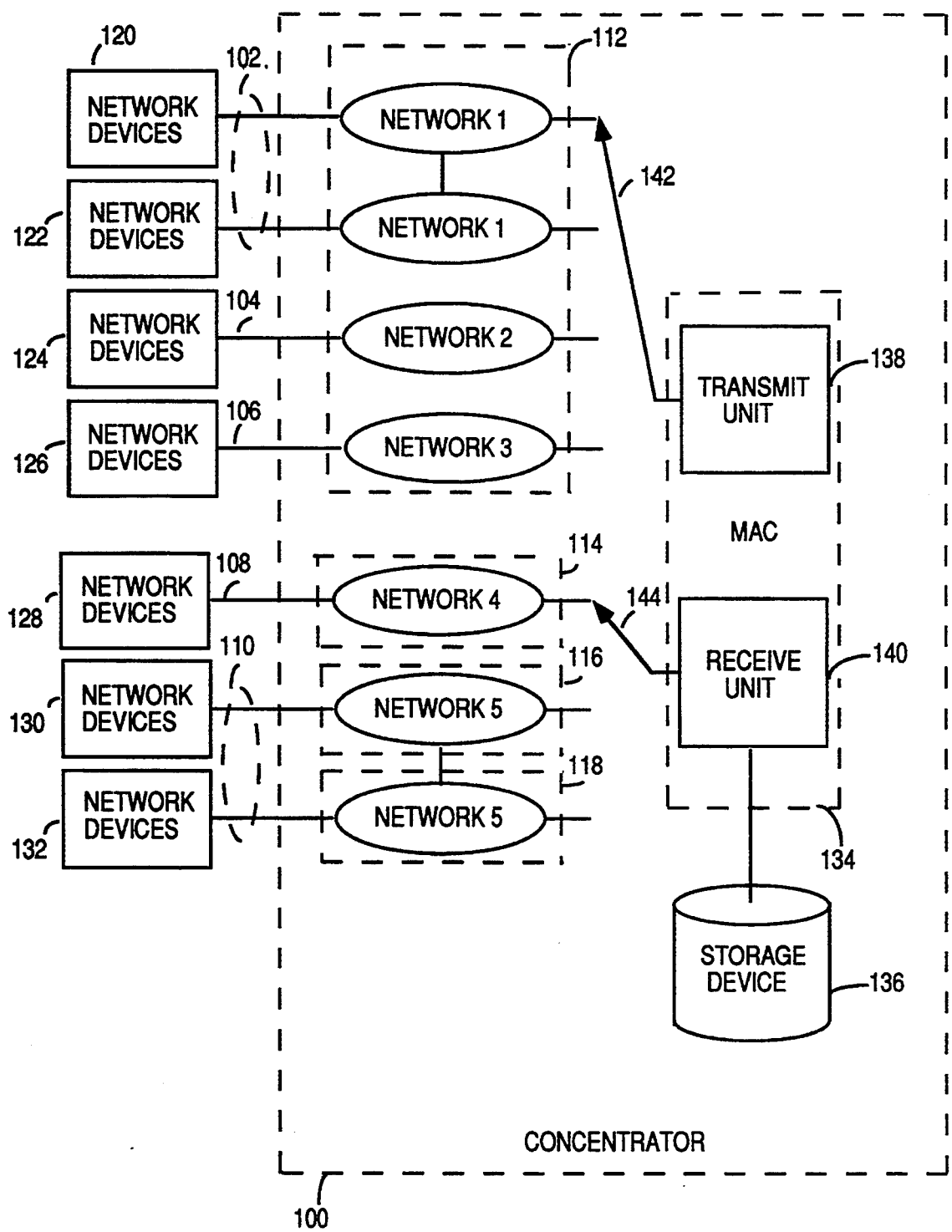
FIG. 1 is a block diagram of a concentrator according to one embodiment of the present invention.

Referring to FIG. 1, it illustrates a block diagram of a concentrator 100 according to one embodiment of the present invention. Concentrator 100 is connected to network devices over a plurality of channels 102, 104, 106, 108 and 110 through a plurality of slots 112, 114, 116 and 118. The actual mapping between the slots 112, 114, 116 and 118 of concentrator 100 and the various channels 102, 104, 106, 108 and 110 may vary. For example, a single slot may connect concentrator 100 to devices on multiple channels, a single slot may connect concentrator 100 to devices on a single channel, and devices on a single channel may be connected to concentrator 100 through multiple slots.

FIG. 1 illustrates examples of each of these variations. Specifically, slot 112 connects concentrator 100 to devices on a plurality of channels 102, 104 and 106. The single slot 114 connects concentrator 100 to devices on the single channel 108. Finally, the two slots 116 and 118 connect concentrator 100 to devices on the single channel 110.

Each channel corresponds to a network and carries the identification signals periodically transmitted by the ID-transmitting devices on its corresponding network. For example, channel 102 corresponds to a network including a first plurality of devices 120 and a second plurality of devices 122. Consequently, the identification signals periodically generated by any ID-transmitting devices included in devices 120 and devices 122 are broadcast over channel 102.

Similarly, channel 104 corresponds to a network including a third plurality of devices 124. The identification signals periodically generated by any ID-transmitting devices included in devices 124 are broadcast over channel 104. Likewise, channel 106 corresponds to a network including a fourth plurality of devices 126. The identification signals periodically generated by any ID-transmitting devices included in devices 126 are broadcast over channel 106. Channel 108 corresponds to a network including a fifth plurality of devices 128. The identification signals periodically generated by any ID-transmitting devices included in devices 128 are broadcast over channel 108. Finally, channel 110 corresponds to a network including a sixth plurality of devices 130 and a seventh plurality of devices 132. The identification signals periodically generated by any ID-transmitting devices included in devices 130 and 132 are broadcast over channel 110.

Concentrator 100 also includes a MAC 134 and a storage device 136. MAC 134 is connected to storage device 136 and is selectively connected to channels 102, 104, 106, 108 and 110 by a plurality of lines 142 and 144. Storage device 136 may be any device on which information can be stored. For example, storage device 136 may be random access memory or a magnetic disk drive.

MAC 134 includes a transmit unit 138 and a receive unit 140. Transmit unit 138 periodically transmits identification signals identifying concentrator 100 over line 142 to channels 102, 104, 106, 108 and 110. Specifically, transmit unit 138 selectively connects line 142 with a first channel of channels 102, 104, 106, 108 and 110 and transmits an identification signal. Transmit unit 138 then selectively connects line 142 with a second channel of channels 102, 104, 106, 108 and 110 and transmits an identification signal. Transmit unit 138 repeats this process to send an identification signal over each of channels 102, 104, 106, 108 and 110 in a predetermined sequence. The specific identification signals sent over each of channels 102, 104, 106, 108 and 110 by transmit unit 138 may differ based on various operational factors, but all identification signals generated by transmit unit 138 identify concentrator 100 as the source of the identification signal.

The transmission of an identification signal once over each channel connected to concentrator 100 is referred to as a transmit cycle operation. Transmit unit 138 is configured to repetitively perform transmit cycle operations, and to complete each transmit cycle operation within a predetermined transmit interval. For example, if the predetermined transmit interval is ten seconds, then transmit unit 138 will complete a transmit cycle operation every ten seconds. Consequently, an identification signal will be transmitted over each of channels 102, 104, 106, 108 and 110 at least once every ten seconds.

Receive unit 140 monitors the identification signals broadcast by other devices over channels 102, 104, 106, 108 and 110, and stores data on storage device 136 to indicate the source of the identification signals thus received and the port on which they were received. Specifically, receive unit 140 selectively connects line 144 with a first group of devices 120. Receive unit 140 monitors all of the signals transmitted by the first group of devices 120 for a predetermined monitoring period. For all identification signals sent by the first group of devices 120 during the predetermined monitoring period, receive unit 140 stores, on storage device 136, data indicating the source of the identification signal and the port on which it was received. Once the monitoring period has expired, receive unit 140 selectively connects line 144 with a second group of devices 122. Receive unit 140 monitors all of the signals sent by the second group of devices 122 for the predetermined monitoring period. For all identification signals sent by the second group of devices 122 during the predetermined monitoring period, receive unit 140 stores, on storage device 136, data indicating the source of the identification signal and the port on which it was received.

Once the monitoring period has expired, receive unit 140 selectively connects line 144 with a third group of devices 124. Receive unit 140 repeats this process to monitor identification signals sent by each group of devices in a predetermined monitoring sequence. Once all of the device groups to which concentrator 100 is connected have been monitored for the monitoring period, receive unit 140 selectively connects line 144 with the first device group 120 and repeats the monitoring process.

The monitoring period for each device group is sufficiently long to ensure that at least one identification signal from each ID-transmitting device in the selected group is received during the monitoring period. For example, if each ID-transmitting device of devices 124 broadcasts an identification signal over channel 104 every ten seconds, then the monitoring period for device group 124 will be at least ten seconds. The duration of the monitoring period is important, since failure to receive an identification signal from an ID-transmitting device on a given channel during the given channel's monitoring interval may cause the data on storage device 136 to reflect a different network configuration than the actual network configuration. As a result, a network topology generated based on the data stored on storage device 136 may not accurately display connections to the ID-transmitting device whose identification signal was not detected.

Figure 2:
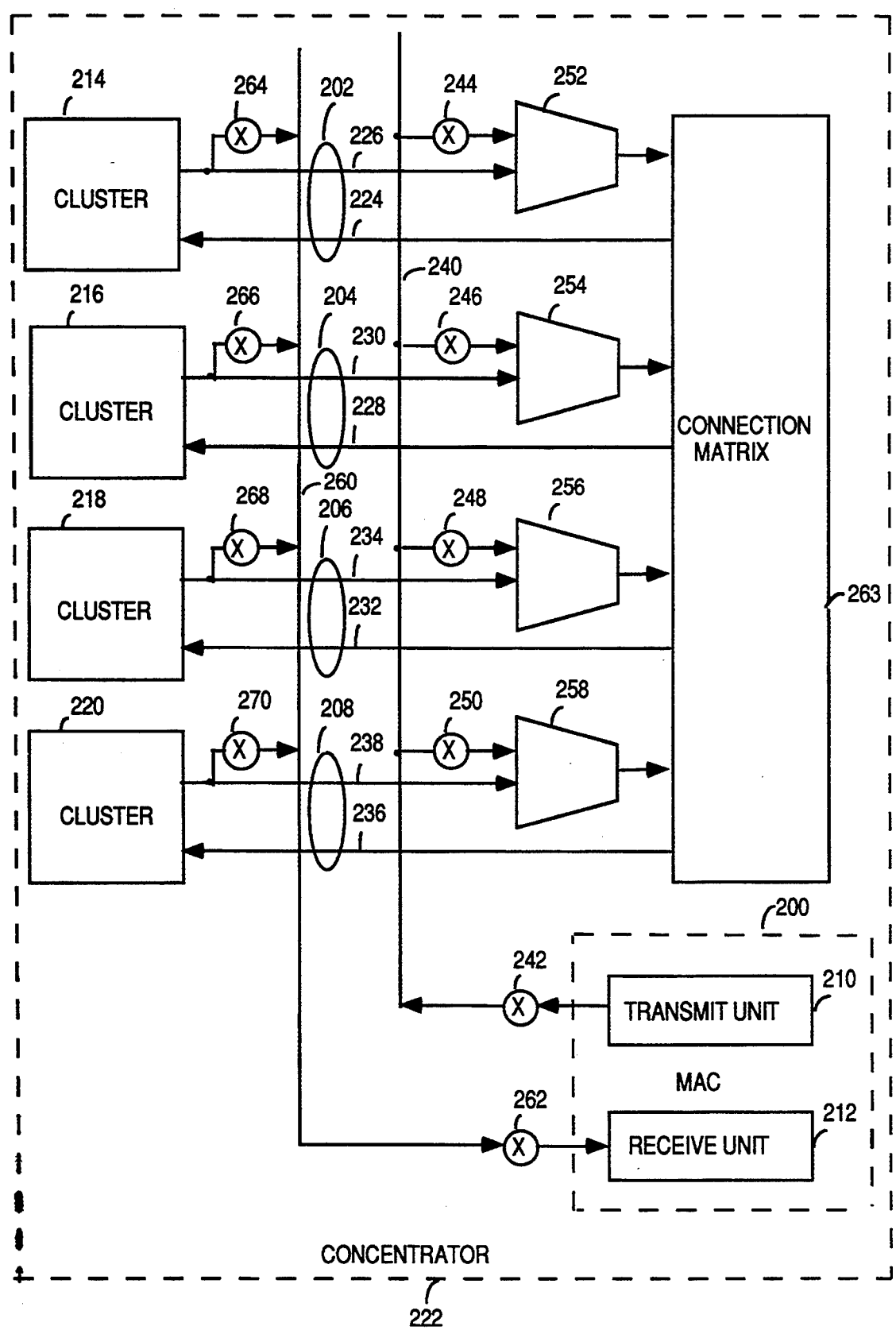
FIG. 2 is a schematic diagram illustrating connections within a concentrator according to an embodiment of the present invention.

Referring now to FIG. 2, it illustrates a schematic diagram showing the connections between a MAC 200, a connection matrix 263, and a plurality of clusters 214, 216, 218 and 220, in a concentrator 222.

Clusters 214, 216, 218 and 220 include ports through which devices are connected to concentrator 222. Clusters 214, 216, 218 and 220 are connected to connection matrix 263 through a plurality of cluster communication lines 202, 204, 206 and 208. Specifically, cluster 214 is connected to connection matrix 263 by cluster communication lines 202, cluster 216 is connected to connection matrix 263 by cluster communication lines 204, cluster 218 is connected to connection matrix 263 by cluster communication lines 206, and cluster 220 is connected to connection matrix 263 by cluster communication lines 208.

Each of cluster communication lines 202, 204, 206 and 208 includes a receive line and a transmit line. Connection matrix 263 receives identification signals from the ID-transmitting devices connected to a given cluster over the receive line, and broadcasts a combined signal to the devices connected to the given cluster over the transmit line. The combined signal includes all of the signals originally transmitted by all devices on the network corresponding to the given cluster. For example, cluster communication lines 202 include a transmit line 224 and a receive line 226. The ID-transmitting devices connected to cluster 214 send identification signals to the connection matrix 263 over receive line 226, and receive signals from all devices on their respective network through the connection matrix 263 over transmit line 224.

Likewise, cluster communication lines 204 include a transmit line 228 and a receive line 230. The ID-transmitting devices connected to cluster 216 transmit signals to the connection matrix 263 over line 230, and receive signals from all devices on their respective network through the connection matrix 263 over line 228. Cluster communication lines 206 include a transmit line 232 and a receive line 234. The ID-transmitting devices connected to cluster 218 transmit signals to the connection matrix 263 over line 234, and receive signals from all devices on their respective network through the connection matrix 263 over line 232. Cluster communication lines 208 include a transmit line 236 and a receive line 238. The ID-transmitting devices connected to cluster 220 transmit signals to the connection matrix 263 over line 238, and receive signals from all devices on their respective network through the connection matrix 263 over line 236.

MAC 200 includes a transmit unit 210 and a receive unit 212. Transmit unit 210 is connected to a transmit bus 240 through a switch 242. Transmit bus 240 is connected to receive lines 226, 230, 234 and 238 through a plurality of switches 244, 246, 248 and 250 and a plurality of signal combining units 252, 254, 256, and 258, respectively. Receive unit 212 is connected to a receive bus 260 through a switch 262. Receive bus 260 is connected to receive lines 226, 230, 234 and 238 through a plurality of switches 264, 266, 268 and 270, respectively.

Transmit unit 210 is configured to transmit concentrator identification signals sequentially over each receive line of receive lines 226, 230, 234 and 238 which corresponds to a unique network. Specifically, assuming that each of clusters 214, 216, 218 and 220 correspond to different networks, transmit unit 210 causes switch 242 to close, switch 244 to close, and switches 246, 248 and 250 to open. Transmit unit 210 then transmits a concentrator identification signal over transmit bus 240. Signal combining unit 252 combines the concentrator identification signal with the signal on receive line 226. Connection matrix 263 then sends the combined signal over line 224 back to the devices connected to cluster 214. Connection matrix 263 also sends the combined signal to all clusters connected to devices which belong to the same network as the devices connected to cluster 214.

Transmit unit 210 then causes switch 244 to open and switch 246 to close. Transmit unit 210 once again sends a concentrator identification signal over transmit bus 240. Since switch 246 is closed, the concentrator identification signal is combined with the signal on receive line 230 by signal combining unit 254. Connection matrix 263 then sends the combined signal over line 228 back to the devices connected to cluster 216. Connection matrix 263 also sends the combined signal to all clusters connected to devices which belong to the same network as the devices connected to cluster 216.

Transmit unit 210 then opens switch 246, closes switch 248, and transmits a concentrator identification signal over line 240 to cause a concentrator identification signal to be transmitted to the devices on the network associated with cluster 218. Transmit unit 210 completes a transmit cycle operation by opening switch 248, closing switch 250, transmitting a concentrator identification signal over line 240 to cause a concentrator identification signal to be transmitted to all of the devices on the network associated with cluster 220, and opening switch 250.

Transmit unit 210 is configured to repetitively perform transmit cycle operations, and to complete each transmit cycle operation within a predetermined transmit interval. As a result, a concentrator identification signal will be sent to each device on each of the networks connected to concentrator 222 at least once during each transmit interval.

As explained above, each transmit line carries the signals from all devices on the same network as the cluster attached to the transmit line. Therefore, the transmission of a concentrator identification signal on more than one receive line for any given network will result in the generation of unnecessary traffic over that network. For example, assume that clusters 214 and 216 are connected to devices belonging to the same network. When a concentrator identification signal is placed on receive line 226, it will be broadcast over transmit lines 224 and 228. Likewise, when a concentrator identification signal is placed on receive line 230, it will be broadcast over transmit lines 224 and 228. Consequently, if a concentrator identification signal is sent to both receive line 226 and receive line 230 during the same transmit cycle, then the devices connected to clusters 214 and 216 will receive more than one concentrator identification signal from concentrator 222 during a single transmit cycle.

In light of the foregoing, it is preferred that a concentrator identification signal be sent to only one receive line per network. For example, if the devices attached to cluster 214 and 216 belong to the same network, then a concentrator identification signal is sent to either receive line 226 or receive line 230, but not to both.

Receive unit 212 is configured to monitor the identification signals generated by the devices connected to all of the channels supported by concentrator 222. In order to accomplish this task, receive unit causes switch 262 to close, switch 264 to close, and switches 266, 268 and 270 to open. The signals on receive line 226 will thus be communicated to receive unit 212 over receive bus 260. The signals on receive line 226 include all of the identification signals generated by the devices represented by cluster 214. Receive unit 212 continues to monitor receive line 226 for a predetermined monitoring period. The duration of the predetermined monitoring period is at least as long as the longest transmit interval of any device connected to cluster 214. For example, if all of the devices connected to cluster 214 transmit identification signals at least once every ten seconds, then the monitoring period for cluster 214 will be at least ten seconds. Consequently, during the monitoring period, receive unit 212 will receive an identification signal from each device connected to cluster 214.

After the predetermined monitoring period for cluster 214, receive unit 212 causes switch 264 to open and switch 266 to close. Thus, the signals on receive line 230 will be communicated to receive unit 212 over receive bus 260. Receive unit 212 monitors receive line 230 for a monitoring period having a duration at least as long as the longest identification transmit interval of all devices connected to cluster 216 to ensure that an identification signal from each device connected to cluster 216 is received during the monitoring interval. Receive unit 214 continues to monitor the identification signals on each cluster in the above-described manner until all of the devices connected to concentrator 222 have been monitored. Receive unit 214 then repeats the monitoring process, sequentially monitoring each cluster for a predetermined monitoring period. During the monitoring process, receive unit 212 stores an indication of all identification signals received, including the identification of the device from which each identification signal originated, and the port on which it was received.

Under certain circumstances, it may not be desirable to monitor the receive line from every cluster. For example, assume that no identification signals are received on receive line 226 during multiple consecutive monitoring periods. Based on this information, it may be assumed that no devices which generate identification signals are currently connected to cluster 214. Therefore, it is preferred that receive line 226 not be monitored until a new device is connected to cluster 214.

Typically, the concentrator 222 will keep track of information which will indicate the presence of a new device when a new device is connected to cluster 214. For example, many concentrators maintain a "source address count" indicative of how many devices are connected to a cluster. An increase in the source address count corresponding to cluster 214 indicates the addition of a new device. Therefore, after a monitoring period in which no identification signals are received, the receive line from cluster 214 will not be monitored again until an increase in the source address count corresponding to cluster 214.

Other circumstances may exist in which it is determined undesirable to monitor the signals on a cluster. Therefore, receiver unit 212 is preferably configured to select the receive lines to be monitored during each monitoring cycle based on information maintained in concentrator 222.

Figure 3:
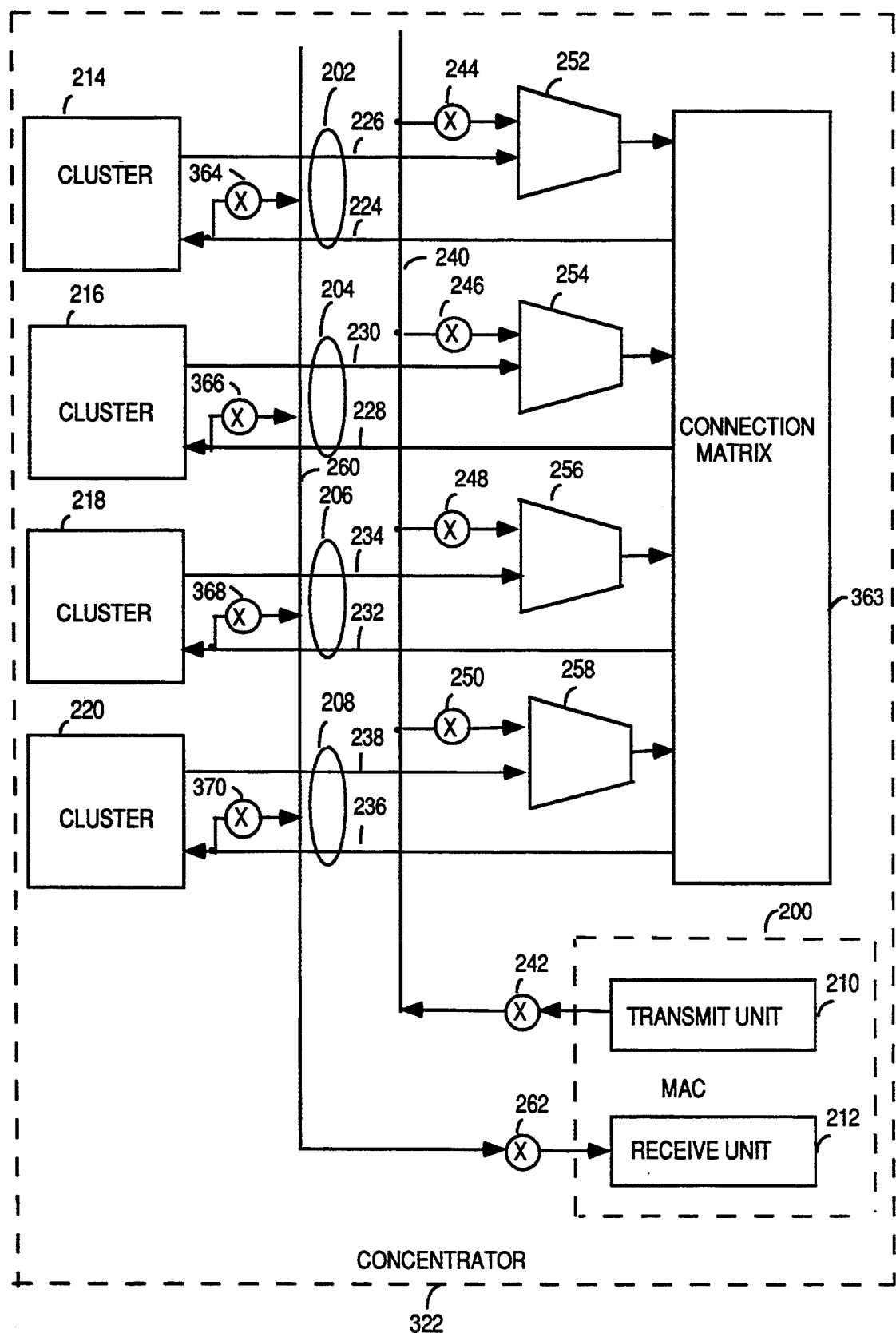
FIG. 3 is a schematic diagram illustrating connections within a concentrator according to an alternative embodiment of the present invention.

Referring now to FIG. 3, it illustrates a schematic diagram showing the connections between MAC 200, connection matrix 263, and clusters 214, 216, 218 and 220 in a concentrator 322 according to an alternative embodiment of the invention. Concentrator 322 differs from concentrator 222 in that receiver unit 212 is configured to monitor the identification signals generated by the ID-transmitting devices on the networks connected to concentrator 322 over transmit lines 224, 228, 232 and 236 rather than receive lines 226, 230, 234 and 238.

Specifically, receive unit causes switch 262 to close, switch 364 to close, and switches 366, 368 and 370 to open. The signals on transmit line 224 will thus be communicated to receive unit 212 over receive bus 260. The signals on transmit line 224 include all of the identification signals generated by the ID-transmitting devices on the same network as cluster 214. Receive unit 212 continues to monitor transmit line 224 for a predetermined monitoring period. The duration of the predetermined monitoring period is at least as long as the longest transmit interval of any ID-transmitting device on the network corresponding to cluster 214. Consequently, during the monitoring period, receive unit 212 will receive an identification signal from each ID-transmitting device on the network corresponding to cluster 214.

After the predetermined monitoring period for the network corresponding to cluster 214, receive unit 212 causes switch 364 to open and switch 366 to close. Thus, the signals on transmit line 228 will be communicated to receive unit 212 over receive bus 260. Receive unit 212 monitors transmit line 228 for a monitoring period having a duration at least as long as the longest identification transmit interval of all ID-transmitting devices on the network corresponding to cluster 216 to ensure that an identification signal from each ID-transmitting device on the network corresponding to cluster 216 is received during the monitoring interval. Receive unit 212 continues to monitor transmit lines in the above-described manner until all of the networks connected to concentrator 222 have been monitored. Receive unit 212 then repeats the monitoring process, sequentially monitoring each network connected to concentrator 222 for a predetermined monitoring period. During the monitoring process, receive unit 212 stores an indication of all identification signals received, including the identification of the ID-transmitting device from which each identification signal originated, and the slot and port on which it was received.

As explained above, each receive line carries only the signals from devices connected to the cluster attached to the receive line, while each transmit line carries the signals from all devices on the same network as the cluster attached to the transmit line. Consequently, the receive lines from every cluster must be monitored to receive all of the identification signals on all of the networks, as explained above with reference to FIG. 2. However, only one transmit line per network must be monitored to receive all of the identification signals on all of the networks. For example, assuming that the devices connected to clusters 214 and 216 belong to the same network, receiver unit 212 need monitor only one of transmit lines 224 and 228 to receive identification signals from the ID-transmitting devices connected to both cluster 214 and cluster 216. Since fewer lines must be monitored, the delay between monitoring intervals for a given network is reduced. As a result, the average delay between topology changes and the detection of topology changes is reduced.

As is evident by the foregoing, a concentrator which supports a plurality of channels is provided. Each supported channel corresponds to a given network. Identification signals from each ID-transmitting device on the given network are periodically transmitted over the corresponding channel. The concentrator stores information based on the identification signals transmitted over the channels supported by the concentrator. From this stored information, a physical topology of the networks to which the concentrator belong may be constructed.

In order to store data contained in the identification signals, all of the channels supported by the concentrator must be monitored. Rather than have a separate MAC for each supported channel, which can be expensive and complicated, the present concentrator has a single MAC capable of monitoring all of the supported channels. A MAC can only monitor one channel at a time, so a receive unit of the MAC monitors each of the supported channels in sequence. Each of the supported channels is monitored for a predetermined monitoring period to ensure that every ID-transmitting device on the channel has transmitted an identification signal during the monitoring period. The MAC also has a transmit unit that sequentially transmits an identification signal identifying the concentrator over each channel. The transmit unit transmits an identification signal identifying the concentrator over each channel at least once during a predetermined transmit interval.

While specific embodiments of the present invention have been described, various modifications and substitutions will, by this disclosure, no-doubt become apparent to one skilled in the art. Such modifications and substitutions are within the scope of the present invention, and are intended to be covered by the following claims.

What is claimed is:

1. An apparatus for use in a multiple-network system, said multiple-network system containing a plurality of networks, said plurality of networks containing a plurality of ID-transmitting devices, each ID-transmitting device of said plurality of ID-transmitting devices periodically broadcasting identification signals, the apparatus comprising:

a plurality of communication lines connecting said apparatus to said plurality of networks, said plurality of communication lines including a first set of communication lines and a second set of communication lines;

a medium access controller including a transmit unit and a receive unit;

said transmit unit being coupled to said first set of communication lines, said transmit unit sequentially broadcasting concentrator identification signals over each communication line of said first set of communication lines, said transmit unit broadcasting a concentrator identification signal over each communication line of said first set of communication lines at least once during a predetermined transmit interval;

said receive unit being coupled to said second set of communication lines, said receive unit sequentially monitoring each communication line of said second set of communication lines for a predetermined monitoring period, said receive unit storing data indicative of the ID-transmitting devices of said plurality of ID-transmitting devices that broadcast the identification signals detected on each given communication line of said second set of communication lines during said predetermine monitoring period for said given communication line.

2. The apparatus of claim 1 wherein the ID-transmitting devices of said plurality of ID-transmitting devices transmit said identification signals at fixed intervals, said predetermined monitoring period being equal to or greater than a longest fixed interval said fixed intervals.

3. The apparatus of claim 1 further including a plurality of clusters, each cluster of said plurality of clusters being associated with a network of said plurality of networks, said plurality of communication lines including a plurality of receive lines and a plurality of transmit lines, each cluster of said plurality of clusters being connected to a receive line of said plurality of receive lines and a transmit line of said plurality of transmit lines, wherein a receive line connected to a given cluster carries identification signals from ID-transmitting devices connected to said given cluster, wherein a transmit line connected to a given cluster carries identification signals from all ID-transmitting devices on said network associated with said given cluster.

4. The apparatus of claim 3 wherein said first set of communication lines comprise a selected set of receive lines of said plurality of receive lines.

5. The apparatus of claim 4 wherein said selected set of receive lines includes no more than one receive line corresponding to any given network of said plurality of networks.

6. The apparatus of claim 3 wherein said second set of communication lines comprise a selected set of receive lines of said plurality of receive lines.

7. The apparatus of claim 6 wherein said selected set of receive lines is a subset of said plurality of receive lines selected based on information stored in said apparatus.

8. The apparatus of claim 7 wherein said selected set includes only receive lines of said plurality of receive lines over which identification signals were received during a prior monitoring period.

9. The apparatus of claim 3 wherein said second set of communication lines comprise a selected set of transmit lines of said plurality of transmit lines.

10. The apparatus of claim 9 wherein said selected set of transmit lines includes no more than one transmit line corresponding to any given network of said plurality of networks.

11. A method for monitoring a plurality of identification signals received at a concentrator in a multiple-network system, the concentrator having a plurality of communication lines, each communication line of the plurality of communication lines corresponding to a network, the method comprising the steps of:

sequentially broadcasting concentrator identification signals over each communication line of a first selected set of communication lines, said first selected set of communication lines being a first subset of said plurality of communication lines, said concentrator identification signals identifying the concentrator, wherein a concentrator identification signal is broadcast at least once over each communication line of said first selected set of communication lines during a predetermined transmit interval;

sequentially monitoring each communication line of a second selected set of communication lines for a monitoring period, said second selected set of communication lines being a second subset of said plurality of communication lines; and storing data indicative of the identification signals detected on each given communication line of said second set of communication lines during said monitoring period for said given communication line.

12. A concentrator for use in a multiple-network system, comprising:

a plurality of communication lines, said plurality of communication lines including a plurality of receive lines and a plurality of transmit lines;

a plurality of clusters, each cluster of said plurality of clusters being connected to a receive line of said plurality of receive lines and a transmit line of said plurality of transmit lines;

a transmit unit;

a first set of lines, said first set of lines connecting the transmit unit to said plurality of communication lines through a first plurality of switches, each line of said first set of lines connecting the transmit unit to a corresponding communication line of said plurality of communication lines through a corresponding switch of said first plurality of switches, wherein said transmit unit closes one switch and opens all other switches of said first plurality of switches while transmitting a concentrator identification signal;

a receive unit; and a second set of lines, said second set of lines connecting the transmit unit to said plurality of communication lines through second plurality of switches, each line of said second set of lines connecting the receive unit to a corresponding communication line of said plurality of communication lines through a corresponding switch of said second plurality of switches, wherein said receive unit closes one switch and opens all other switches of said second plurality of switches when performing a monitoring operation.

13. The concentrator of claim 12 where said transmit unit transmits said concentrator identification signal over a selected transmit line of said first set of lines, said transmit unit closing said corresponding switch of said selected transmit line prior to transmitting said concentrator identification signal over said selected transmit line and opening said corresponding switch after transmitting said concentrator identification signal over said selected transmit line.

14. The concentrator of claim 13 wherein said transmit unit sequentially selects each line of said first set of lines as said selected transmit line.

15. The concentrator of claim 14 wherein said receive unit monitors a selected monitored line of said second set of lines, said receive unit closing said corresponding switch of said selected monitored line prior to monitoring said selected monitored line and opening said corresponding switch after monitoring said selected monitored line.

16. The concentrator of claim 15 wherein said receive unit sequentially selects each line of said second set of lines as said selected monitored line.

17. The concentrator of claim 16 wherein the receive unit is configured to monitor said selected monitored line by detecting and storing data indicative of a plurality of identification signals received over said selected monitored line, said plurality of identification signals being generated by a plurality of monitored ID-transmitting devices.

18. The concentrator of claim 17 wherein the receive unit is configured to monitor said selected monitored line for a predetermined monitoring period.

19. The concentrator of claim 18 wherein said monitored ID-transmitting devices of said plurality of monitored ID-transmitting devices transmit said identification signals over said selected monitored line at least once during a fixed interval, the predetermined monitoring period being equal to or greater than the fixed interval.

* * * * *